United States Patent [19]

Allen et al.

[11] Patent Number: 4,727,093

[45] Date of Patent: Feb. 23, 1988

[54] LOW DENSITY PARTICLES OF POLYPHENYLENE ETHER RESINS

[75] Inventors: Richard B. Allen; Frederick L. Sanford, both of Pittsfield, Mass.

[73] Assignee: General Electric Company, Selkirk, N.Y.

[21] Appl. No.: 923,555

[22] Filed: Oct. 27, 1986

[51] Int. Cl.[4] ............................................... C08J 9/14
[52] U.S. Cl. ...................................... 521/139; 264/53; 521/79; 521/81; 521/180
[58] Field of Search ................... 521/81, 180, 139, 79

[56] References Cited

U.S. PATENT DOCUMENTS

| | | |
|---|---|---|
| 2,442,940 | 6/1948 | Staudinger et al. . |
| 2,787,809 | 4/1957 | Stastny . |
| 2,888,410 | 5/1959 | Buchholz . |
| 4,532,094 | 7/1985 | Wu et al. . |
| 4,532,263 | 7/1985 | Krutchen et al. . |
| 4,535,100 | 8/1985 | Krutchen et al. ...................... 521/81 |
| 4,579,710 | 4/1986 | Krutchen et al. . |
| 4,579,873 | 4/1986 | Krutchen et al. . |
| 4,579,874 | 4/1986 | Krutchen et al. . |
| 4,579,878 | 4/1986 | Krutchen et al. . |
| 4,587,271 | 5/1986 | Krutchen et al. . |
| 4,594,208 | 7/1986 | Krutchen et al. . |
| 4,598,098 | 7/1986 | Krutchen et al. ...................... 521/81 |
| 4,598,100 | 7/1986 | Krutchen et al. ...................... 521/81 |
| 4,598,101 | 7/1986 | Krutchen et al. ...................... 521/81 |
| 4,598,104 | 7/1986 | Krutchen et al. ...................... 521/81 |

*Primary Examiner*—Morton Foelak
*Attorney, Agent, or Firm*—Michael J. Doyle

[57] ABSTRACT

Low density particles or beads of polyphenylene ether or polyphenylene ether-polystyrene blends are provided by incorporation of a suitable blowing agent such as pentane into the resin mixture, flowed by expansion of the resin particles by exposure temperatures near the Tg of the blend.

15 Claims, No Drawings

LOW DENSITY PARTICLES OF POLYPHENYLENE ETHER RESINS

FIELD OF THE INVENTION

The invention relates to compositions and processes to make low density particles of polyphenylene ether resins or blended polyphenylene ether and polystyrene resins.

BACKGROUND OF THE INVENTION

Expanded low density polyphenylene ether resin compositions exhibit superior thermal properties compared to conventional expanded polystyrene. Expanded low density polyphenylene ether resin compositions of the present invention will provide better Continuous Use Temperature (C.U.T.) performance than conventional EPS materials. Furthermore, polyphenylene ethers provide a degree of inherent flame resistance not available from styrenic resins.

These low density polyphenylene ether resin compositions will provide better mechanical properties as the PPE content is increased. Such materials can be used in traditional EPS applications such as those requiring energy absorption (e.g. knee restraints), sound insulation, and heat insulation.

The polyphenylene ether resins (PPE) are known to be combinable with alkenyl aromatic polymers (PS) to provide thermoplastic compositions which are extrudable and moldable into articles of high heat resistance, good impact strength and hydrolytic stability, and good dimensional stability. The compositions can also be formulated into various types, including flame retardant, reinforced, platable, or foamable grades.

The polyphenylene ether resins and method of their formation are described in the patent literature, including U.S. Pat. Nos. 3,306,874 and 3,306,875 (Hay), and U.S. Pat. Nos. 3,257,357 and 3,257,358 (Stamatoff). A mixture of polyphenylene ether resin with poly(alkenyl aromatics), including polystyrene, rubber modified polystyrene and styrenic co-and terpolymers is disclosed by Cizek, in U.S. Pat. No. 3,383,435.

Several grades of foamable PPE/PS blends are available commercially. These typically will be used to fabricate structural foam parts utilizing molds and techniques analogous to injection molding processes. Additionally, these structural foam compositions are chemically foamed, and typically exhibit densities far greater than the expandable PPE/PS compositions of the present invention. Conventional PPE/PS structural foam exhibits densities in excess of 50 lbs./ft$^3$. Such injection moldable foam materials are quite distinct from the low density PPE/PS compositions of the present invention which exhibit densities less than 20 lbs./ft$^3$.

It has now been discovered that PPE and PPE/PS materials having densities less than 20 lbs./ft$^3$ can be provided by the process of the present invention. Furthermore it is now possible to provide PPE based foams having densities less than 2 lbs./ft$^3$.

SUMMARY OF THE INVENTION

Low density particles of blends of polyphenylene ether and polystyrene resins are provided by the process of the present invention. Accordingly, it is possible to provide expandable PPE/PS particles which provide products having a density less than 20 lbs./ft3. For purposes of the present specification the expressions polystyrene and PS are meant to refer to both polystyrene homopolymer as well as the more general alkenyl aromatic or vinyl aromatic homopolymers or copolymers which may also be utilized.

Polyphenylene ether resins and polystyrene resins are combinable in all proportions. It is contemplated, however, that low density compositions of the present invention are comprised of at least 2 weight percent PPE (based upon the weight of PPE and PS taken together). Compositions containing less than 2 weight percent PPE are considered to be primarily polystyrene compositions and do not exhibit the beneficial property improvements associated with PPE/PS blends. It is well known that the addition of PPE to polystyrene blends offers improvements in impact strength, flammability ratings, tensile strength and other mechanical properties. Conversely, polystyrene is typically blended with polyphenylene ether resins to offer better processability for many thermoplastic processes.

Typical PPE/PS blends useful in the practice of the present invention will be comprised of between 10 to 90 percent and preferably 20 to 80 percent by weight PPE and 90 to 10 weight percent PS based upon the weight of the two resins taken together. It is contemplated, however, that the process of the present invention may be practiced for resin systems having up to one hundred percent PPE resin thereby providing low density PPE particles not heretofore available.

PPE resin or blends of PPE and PS are provided in a conventional manner as will be described below. Small particles, such as pellets of the resin blend are thereafter subjected to the process of the invention.

In order to make the low density particles or beads of the PPE/PS blend, the pellets are first incorporated with a blowing agent. The blowing agent will typically be a hydrocarbon or fluorocarbon having a boiling temperature less than the glass transition temperature (Tg) of the blend. When pentane is used as the blowing agent, approximately 6 to 10 percent by weight of pentane may be absorbed into the pellets of the PPE/PS blend.

The blowing agent can be incorporated into the PPE/PS blend by any of several methods. In one method, the pellets may be exposed to the blowing agent under a saturated atmosphere of the blowing agent. In another method, a suspension of the PPE/PS pellets in water can be exposed to the blowing agent. Each of these methods is exemplified below.

After the blend of PPE and PS have been exposed to an amount of blowing agent sufficient to effect adequate expansion of the particles, the process proceeds with an expansion step to provide the low density product of the invention.

For low density PPE and blends of PPE and polystyrene it has been found that the expansion of the pellets must take place by heating the pellets to nearly the Tg of the blend. Preferably, this step is accomplished under a pressurized steam atmosphere.

Although the expansion step is preferably accomplished via pressurized steam for safety reasons, other methods are available. Hot air can be suitably used as can a hot oil jacketed vessel. The most expansion will usually be obtained under condition of vacuum as long as adequate heat is utilized.

DESCRIPTION OF THE INVENTION

The invention may be practiced with use of a wide variety of materials encompassed within the broader description given above. In the typical case, however, use is made of certain preferred materials which are described below.

The polyphenylene ether resin is normally a homo- or copolymer having units of the formula

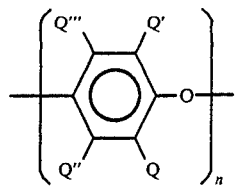

wherein Q, Q', Q" and Q'" are independently selected from the group consisting of hydrogen, halogen, hydrocarbon, halohydrocarbon, hydrocarbonoxy, and halohydrocarbonoxy; and n represents the total number of monomer units and is an integer of at least about 20, and more usually at least 50.

The polyphenylene ether resin can be prepared in accordance with known procedures, such as those described in the above mentioned patents of Hay and Stamatoff, from the reaction of phenols including but not limited to: 2,6-dimethylphenol; 2,6-diethylphenol; 2,6-dibutylphenol; 2,6-diaurylphenol; 2,6-dipropylphenol; 2,6-diphenylphenol; 2-methyl-6-tolylphenol;; 2-methyl-6-methoxyphenol; 2,3,6-trimethylphenol; 2,3,5,6-tetramethylphenol, and 2,6-diethyoxyphenol.

Each of these may be reacted alone to produce the corresponding homopolymer, or in pairs or with still other phenols to produce the corresponding copolymer. Examples of the homopolymer include poly(2,6-dimethyl-1,4-phenylene ether), poly(2,6-diethyl-1,4-phenylene ether), poly(2,6-dibutyl-1,4-phenylene ether), poly(2,6-diauryl-1.4-phenylene ether) poly(2,6-dipropyl-1,4-phenylene ether) poly(2,6-diphenyl-1,4-phenylene ether), poly(2-methyl-6-tolyl-1,4-phenylene ether), poly(2-methyl-6-methoxy-1,4-phenylene ether), poly(2-methyl-6-butyl-1,4-phenylene ether), poly(2,6-dimethoxy-1,4-phenylene ether, poly(2,36-trimethyl-1,4phenylene ether), poly(2,356-tetramethyl-1,4-phenylene ether), and poly(2,3,5,6-tetramethyl-1,4-phenylene ether), and poly(2,6-diethyoxy-1,4-phenylene ether). Examples of the copolymer include, especially those of 2,6-dimethylphenol with other phenols, such as poly(2,6-dimethyl-co-2,3,6-trimethyl-1,4-phenylene ether) and poly(2,6-dimethyl-co-2-methyl-6-butyl-1,4-phenylene ether).

For purposes of the present invention, an especially preferred family of polyphenylene ethers include those having alkyl substitution in the two positions ortho to the oxygen ether atom, i.e., those of the above formula wherein Q and Q' are alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene ether; poly(2,6-dipropyl-1,4-phenylene)ether; poly(2-ethyl-6-propyl-1,4-phenylene)ether; and the like.

The most preferred polyphenylene ether resin for purposes of the present invention is poly(2,6-dimethyl-1,4-phenylene)ether.

The styrenic of the composition (designated PS) is an alkenyl aromatic polymer. The term "alkenyl aromatic polymer" as it is employed in this disclosure is intended to encompass homopolymers, as well as rubber modified high impact varieties, and also copolymers and terpolymers of alkenyl aromatic compounds with one or more other materials. Preferably, the alkenyl aromatic polymer is based at least in part on units of the formula

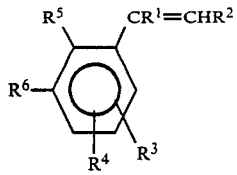

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms; or $R^5$ or $R^6$ may be concatenated together with hydrocarbyl groups to form a naphthyl group.

The above will encompass styrene, as well as homologs and analogs of styrene. Specific examples include, in addition to styrene, chlorostyrene, bromostyrene, alpha-methyl styrene, para-methyl styrene, vinyl styrene, divinylbenzene and vinyl naphthalene. Styrene is especially preferred.

By way of illustration, the polystyrene component can be a homopolystyrene or other alkenyl aromatic homopolymer which has been modified by admixture or interreaction with a natural or synthetic rubber, for example, polybutadiene, polyisoprene, EPDM rubber or silicone rubber; or it can be a copolymer or terpolymer of styrene or other alkenyl aromatic compound with an elastomeric or other material, such as block copolymer of styrene and butadiene (for example, AB, ABA, ABAB or ABABA type), including hydrogenated forms of the foregoing, a radial teleblock copolymer of styrene, butadiene and a coupling agent, including hydrogenated forms, terpolymers of acrylonitrile, styrene and butadiene (ABS), styrene-acrylonitrile copolymers (SAN), and a copolymer of styrene and maleic anhydride (SMA); or it can also be an alkenyl aromatic copolymer or terpolymer which has been modified with rubber, for example, rubber modified styrene-maleic anhydride copolymer. Many of these are described in the patent literature, including the Cizek patent mentioned above.

The PPE and polystyrene resins may be combined in a conventional manner. PPE resin will typically be in powder or pellet form and the polystyrene will typically be in pellet form. The resins may be combined as by dry blending in a blender which provides a relatively uniform mixture of the resins. This mixture is typically directed to a thermoplastic extruder, usually of the single or twin-screw type, where in the case of a blend the resin is compounded with sufficient temperature and shear to provide an intimate PPE/PS blend.

The product of the conventional extruder is an extrudate in the form of strands which may be quenched with cooling water. The cooled strands are directed to a pelletizer device which provides the PPE/PS resin pellets in a convenient form for use in the present invention.

During the blending step it is contemplated that conventional additives may be incorporated in the resin mixture if desired. These include rubbery impact modifiers, flame retarding agents, stabilizers for thermal and color stability, antioxidants, processing aids and plasticizers, reinforcing and extending fillers, pigments and the like. Each of these may be utilized to a greater or lesser degree depending on the required final properties desired in the low density foam product. Conventional surfactants and nucleants used in expanded polystyrene foams may also be utilized. Examples of these include zinc or tin stearates, maleates, fumarate and the like.

Resin pellets prepared in the above described manner may then be subjected to the first step of the process of the invention where the blowing agent is incorporated therein.

The blowing agents which may be utilized in the practice of this invention are volatile liquids or gases which can be absorbed into the polymer mixture and which will vaporize at a temperature below the Tg of the resin matrix. PPE/PS blends typically have a Tg in excess of 100° C. The Tg of such blends increases roughly 10° C. for each 10 weight percent PPE in the resin blend, up to the Tg of PPE (approx. 210° C.). Thus a 30:70 mixture of PPE/PS has a Tg of approximately 125° C. and the Tg of a 50:50 blend is approximately 145°–155° C. Note that these temperatures are for blends prior to absorption of the blowing agent.

The blowing agents may include conventional hydrocarbon or fluorocarbon blowing agents. The preferred hydrocarbon agents will include aliphatic hydrocarbon, especially those having 4 to 7 carbon atoms. Examples include pentane, isopentane, pentene, hexane, heptane and the like.

Fluorocarbon blowing agents include
$CCl_3F$
$CCl_2F_2$
$CHClF_2$
$CClF_2-CClF_2$.

These are commercially available as FREON 11, FREON 12, FREON 22 and FREON 114. Other halogenated hydrocarbon blowing agents may include methylene chloride, chlororform, $CCL_4$ and the like.

Step I: Absorption of Blowing Agent

The first procedure by which the blowing agent may be absorbed into the pellets through exposure to a saturated atmosphere of blowing agent is as follows:
Method I:

The PPO/polystyrene pellets (e.g. 30 gms) are supported in a wire mesh screen and placed into a 300 ml autoclave. The pellets are dispersed in the screen support in order to expose a maximum surface area to the blowing agent vapors.

The autoclave is sealed an evacuated. Once the autoclave is evacuated, a quantity of blowing agent is drawn into the autoclave. The amount of blowing agent charged is determined by the amount of absorption desired and the amount of blowing agent required to maintain a saturated atmosphere.

The autoclave is slowly heated to 90 deg C. and maintained at this temperature for an extended period of time. Higher temperatures would result in pellets that have fused together. The temperature and time is determined by the rate at which the blowing agent is absorbed by the pellets.

The autoclave is allowed to cool to room temperature, opened, and the pellets are removed.
Method II:

An alternate procedure by which blowing agent is absorbed into the pellets, is accomplished through exposure of a water/pellet suspension to the blowing agent as follows:

Approximately 125 gms of pellets are suspended in 250 gms of an aqueous solution of polyvinylalcohol (about 1% PVA by weight). Other suspending agents or surfactants may be utilized, an example would be tricalcium phosphate. This suspension is charged to a 500 ml autoclave and is sufficient to fill this size autoclave to 75% of capacity.

A quantity of the blowing agent is charged to the autoclave.

The autoclave is sealed, agitation is initiated, and the temperature is slowly increased. Agitation is required in order to prevent clumping of the pellets and to improve contact of the pellets with the blowing agent. This is especially useful for systems which consist of more than one liquid phases. The system is heated to a temperature of about the Tg of the blend and allowed to cook for a period of time. The elevated temperature increases the rate at which the blowing agent evenly disperses through the pellets and determines the necessary absorption time.

The system is allowed to cool, any residual pressure is released, and the pellets are removed from the autoclave.

The pellets are separated from the suspension solution with a sieve, rinsed with water and allowed to dry at ambient conditions.

Step II: Expansion of Pellets

The second step in forming the low density particles or beads of PPE or PPE/polystyrene blends is the actual expansion of the pellets. The following is one method for accomplishing the expansion. Once the pellets have been imbibed with the blowing agent, they are heated to the Tg of the blend in a steam autoclave. In this autoclave the beads are in intimate contact with saturated steam at about the Tg of the resin. The temperature is controlled by maintaining a constant steam pressure in the autoclave. Pressurized steam is required because PPE raises the Tg of PPE/PS blends compared to conventional polystyrene.

DESCRIPTION OF THE PREFERRED EMBODIMENTS

In the following examples the PPE resin was poly(2,6-dimethyl-1,4-phenylene ether) having an intrinsic viscosity of approximately 0.46 dl/g as measured in chloroform at 25° C., produced by General Electric Company and known as PPO® resin. The polystyrene was a homopolymer known as HOSTREN 50-D having a melt flow index of 4 to 6 and available commercially from American Hoechst (now Huntsman Chemical).

The PPE and polystyrene resins were intimately mixed in the indicated proportions in a Henschel mixture and were thereafter extruded on a Werner and Pfleider 30 mm twin screw extruder having a melt temperature of approximately 275° C. The extrudate was thereafter quenched and pelletized to provide cyllindrical pellets of 10 to 30 mesh (U.S. standard sieve size).

PROCESS EXAMPLES

Example 1

This is an example of absorption of a hydrocarbon blowing agent into the pellets via exposure to a saturated blowing agent atmosphere (METHOD I) and subsequent expansion: 30 gms of PPE/PS pellets (50 wt. percent PPO) were expos.d to a saturated pentane atmosphere, at 90 deg. C. for 4 hrs. These pellets, which contained about 10% pentane, were then expanded in a steam autoclave at 270 deg. F. The resultant particles had a bulk density of less than 2 lbs/ft$^3$ with a cell size of about 200 cells/inch.

Example 2

This is an example of absorption of a hydrocarbon blowing agent into the pellets via METHOD II and subsequent expansion: 125 gms of PPE/PS pellets (30% PPO by wt.) were suspended in 250 gms of an aqueous, PVA solution (1% by wt.). This suspension was charged with 13.8 gms of pentane and agitated at 130 deg C., (Tg=125 deg C.) for three hours. The resulting pellets contained about 6% by weight pentane and were expanded in a steam autoclave, for one minute, at 250 deg F. The expanded beads had a bulk density of 1 lb/ft$^3$.

Example 3

This is an example of absorption of a fluorocarbon blowing agent via METHOD II and subsequent expansion: 125 gms of pellets (30% by wt./) were suspended in 250 gms of an aqueous PVA solution (1% by wt.). The suspension was agitated with 13.8 gms of CCl$_3$F(Freon-11), at 130 deg C., for three hours. A portion of the resulting pellets which contained about 5% fluorocarbon were expanded at 250 deg F. for 1 minute. The expanded beads had a bulk density less than 20 lbs/ft$^3$ (i.e., 10.5 lbs/ft$^3$).

An attempt was made to expand the remaining portion of these pellets at 100° C. (atmospheric steam). However, even after 10 minutes at 100° C., no expansion of the material was observed.

We claim:

1. A process for producing low density polyphenylene ether resin compositions wherein said polyphenylene ether resin may be admixed with up to approximately 98 weight percent of an alkenyl aromatic resin based upon the weight of both resins taken together, comprising the steps of: incorporating a blowing agent in said resin composition wherein the blowing agent is a volatile liquid or gas selected from the group consisting of C$_4$ to C$_7$ aliphatic hydrocarbons and C$_1$ to C$_2$ fluorocarbons capable of being absorbed by the resin composition and which will vaporize at a temperature below the glass transition temperature of the resin composition, and which is present in an amount sufficient to effect expansion of the resin composition in the next step; expanding the resin composition containing the blowing agent by heating to a temperature between about 100° and 210° C.; thereby providing an polyphenylene ether resin composition having a bulk density less than about 20 lbs./ft$^3$.

2. A process as in claim 1 wherein prior to incorporation of the blowing agent and expansion of the composition, the polyphenylene ether resin composition is in the form of pellets or particles.

3. A process as in claim 2 wherein said pellets or particles are approximately 10 to 30 U.S. Standard mesh in size.

4. A process as in claim 1 wherein said polyphenylene ether resin composition consists essentially of polyphenylene ether.

5. A process as in claim 1 wherein said polyphenylene ether resin composition is comprised of about 10 to 90 parts by weight polyphenylene ether and correspondingly 90 to 10 parts alkenyl aromatic resin per 100 parts by weight of both resins.

6. A process as in claim 1 wherein said polyphenylene ether is a homopolymer or copolymer comprised primarily of 2,6-dimethyl phenylene units and 2,3,6-trimethyl phenylene units and has an intrinsic viscosity of about 0.1 to 0.7 dl/gm as measured in chloroform at 25° C.

7. A process as in claim 1 wherein the alkenyl aromatic resin is a homopolymer or copolymer comprised primarily of styrene and substituted styrene units.

8. A process as in claim 7 wherein said alkenyl aromatic resin is polystyrene.

9. A process as in claim 1 wherein said polyphenylene ether resin composition is further comprised of a rubbery modifier or a flame retarding agent.

10. A process as in claim 1 wherein said blowing agent is present in an amount of about 3 to 15 weight percent based upon the weight of the resin composition.

11. A process as in claim 1 wherein the blowing agent is an aliphatic hydrocarbon selected from the group consisting of pentane, isopentane, pentene, hexane, and heptane.

12. A process as in claim 1 wherein the blowing agent is a fluorocarbon selected from the group consisting of CCl$_3$F, CCl$_2$F$_2$, CHClF$_2$ an CClF$_2$—CClF$_2$.

13. A process as in claim 1 wherein expansion of the resin composition is accomplished with saturated steam at about the Tg of the resin composition.

14. A process as in claim 1 wherein the expanded polyphenylene ether composition has a bulk density between 2 and 15 lbs/ft$^3$.

15. A process as in claim 14 wherein the expanded polyphenylene ether composition has a bulk density less than 2 lbs./ft$^3$.

* * * * *